United States Patent
Sato et al.

(10) Patent No.: US 12,479,188 B2
(45) Date of Patent: Nov. 25, 2025

(54) METHOD FOR MANUFACTURING COMPOSITE MEMBER, AND COMPOSITE MEMBER

(71) Applicant: TOHOKU UNIVERSITY, Sendai (JP)

(72) Inventors: Yutaka Sato, Sendai (JP); Tetsuya Sonoda, Morioka (JP); Takayuki Kuwashima, Morioka (JP); Takahiro Kubo, Morioka (JP)

(73) Assignee: TOHOKU UNIVERSITY, Sendai (JP)

( * ) Notice: Subject to any disclaimer, the term of this patent is extended or adjusted under 35 U.S.C. 154(b) by 216 days.

(21) Appl. No.: 17/912,966

(22) PCT Filed: Mar. 23, 2021

(86) PCT No.: PCT/JP2021/012011
§ 371 (c)(1),
(2) Date: Sep. 20, 2022

(87) PCT Pub. No.: WO2021/093643
PCT Pub. Date: Sep. 30, 2021

(65) Prior Publication Data
US 2023/0118556 A1    Apr. 20, 2023

(30) Foreign Application Priority Data

Mar. 25, 2020 (JP) ................. 2020-053609
Mar. 23, 2021 (JP) ................. 2021-048892

(51) Int. Cl.
*B32B 5/18*     (2006.01)
*B29C 65/06*   (2006.01)
(Continued)

(52) U.S. Cl.
CPC ............ *B32B 5/18* (2013.01); *B29C 65/0681* (2013.01); *B29C 65/44* (2013.01); *B29C 2791/003* (2013.01); *B29K 2105/12* (2013.01)

(58) Field of Classification Search
None
See application file for complete search history.

(56) References Cited

U.S. PATENT DOCUMENTS

2007/0196681 A1 * 8/2007 Biggs .................. B62D 29/043
                                                                  442/232
2011/0139353 A1   6/2011 Sugiyama et al.
(Continued)

FOREIGN PATENT DOCUMENTS

CN      102131632 A    7/2011
CN      109807460 A    5/2019
(Continued)

OTHER PUBLICATIONS

Hosoi, A., Manufacturing Method of Resin Metal Joined Body, Oct. 3, 2019, machine translation of JP2019-166638 (Year: 2019).*
(Continued)

*Primary Examiner* — Chinessa T. Golden
(74) *Attorney, Agent, or Firm* — Oliff PLC (57) ABSTRACT

A method for manufacturing a composite member, in which a composite member having a high joining strength can be manufactured in an inexpensive and efficient way; and the composite member. A metal member and a resin-containing member are joined together by heating the metal member while pressing the resin-containing member against a metal porous film formed on a surface of the metal member. The porous film is formed by impacting the surface of the metal member with metal powder by the cold spray process.

14 Claims, 11 Drawing Sheets

(51) Int. Cl.
*B29C 65/44* (2006.01)
*B29K 105/12* (2006.01)

(56) References Cited

U.S. PATENT DOCUMENTS

| | | | | |
|---|---|---|---|---|
| 2012/0181685 A1* | 7/2012 | Ohno | ............... | H01L 23/3142 257/734 |
| 2015/0167194 A1* | 6/2015 | Tanaka | ............ | B29C 45/14311 205/199 |
| 2016/0047254 A1* | 2/2016 | Bruck | ............... | C23C 24/103 428/307.3 |

FOREIGN PATENT DOCUMENTS

| | | |
|---|---|---|
| JP | 2010-46831 A | 3/2010 |
| JP | 2015-182120 A | 10/2015 |
| JP | 6098527 B2 | 3/2017 |
| JP | 6102813 B2 | 3/2017 |
| JP | 2019-177704 A | 10/2019 |
| JP | 2019166638 A * | 10/2019 |
| WO | 2011/145202 A1 | 11/2011 |
| WO | 2014/021184 A1 | 2/2014 |

OTHER PUBLICATIONS

Oct. 9, 2023 Extended European Search Report issued in European Patent Application No. 21776342.4.
May 25, 2021 International Search Report issued in International Patent Application No. PCT/JP2021/012011.
Sep. 22, 2022 International Preliminary Report on Patentability issued in International Patent Application No. PCT/JP2021/012011.
Shin Horiuchi, "International standard for evaluation and test methods for bonding properties of resin-metal dissimilar material complexes", Journal of the Society of Instrument and Control Engineers, 2015, 54, pp. 743-747.
Seto et al., "Influence of Molding Conditions on Joining Strength of Injection Molded Parts Joined with Metal and Resin", Seikei Kakou, 2015, 27, pp. 68-74.
Henriques et al., "Laser surface structuring of Ti6Al4V substrates for adhesion enhancement in Ti6Al4V-PEEK joints", Materials Science and Engineering: C, 2017, 79, pp. 177-184.
Horiuchi et al., "Analysis of Metal/Plastic Interfaces by Energy-Filtering Transmission Electron Microscopy", Journal of the Adhesion Society of Japan, 2012, 48, pp. 322-330.
Jun. 19, 2025 Office Action issued in Chinese Patent Application No. 202180021530.2.

* cited by examiner

METHOD FOR MANUFACTURING COMPOSITE MEMBER, AND COMPOSITE MEMBER

FIELD OF THE INVENTION

The present invention relates to a method for manufacturing a composite member and the composite member.

DESCRIPTION OF RELATED ART

As a method of joining a metal with a resin, direct joining methods have been extensively studied in which a molten resin is fused with a metal surface (for example, see Nonpatent Literature 1). As the direct joining methods, a method for manufacturing a complete member joined together firmly by virtue of the anchor effect have been proposed, the method including: for example, forming minute pit corrosions by chemical etching or uneven patterns by laser irradiation on a metal surface, and then filling these minute structures with a molten resin by hot pressing or injection forming, and then cooling and solidifying the resin (for example, see Patent Literature 1 and Nonpatent Literatures 2 to 4).

CITATION LIST

Non-Patent Literature

Nonpatent Literature 1: Shin Horiuchi, "International standard for evaluation and test methods for bonding properties of resin-metal dissimilar material complexes", Journal of the Society of Instrument and Control Engineers, 2015, 54, pp. 743-747

Nonpatent Literature 2: Masahiro Seto, Yoshihiro Asami, Masahiko Itakura, Hiroaki Tanaka, Masashi Yamabe, "Influence of Molding Conditions on Joining Strength of Injection Molded Parts Joined with Metal and Resin", Seikei Kakou, 2015, 27, pp. 68-74 Nonpatent Literature 3: Shin Horiuchi, Takeshi Hanada, Takayuki Miyamae, Tadae Yamanaka, Kogoro Osumi, Naoki Ando, Masanori Naritomi, "Analysis of Metal/Plastic Interfaces by Energy-Filtering Transmission Electron Microscopy", Journal of The Adhesion Society of Japan, 2012, 48, pp. 322-330

Nonpatent Literature 4: B. Henriques, "Laser surface structuring of Ti6Al4V substrates for adhesion enhancement in Ti6Al4V-PEEK joints", Materials Science and Engineering: C, 2017, 79, pp. 177-184

Patent Literature

Patent Literature 1: JP-A-2019-177704

SUMMARY OF THE INVENTION

However, in the methods of manufacturing a composite member by direct joining as described in Patent Literature 1 and Nonpatent Literatures 2 to 4, laser irradiation has a problem in that a resin is more susceptible to exfoliation due to weak sticking of the resin in a direction perpendicular to a hole formed by laser irradiation. Further, these methods suffer from complicated manufacturing steps due to a large number of parameters to be handled in controlling laser irradiation, and also suffer from expensive equipment. Moreover, chemical etching requires multiple cycles of pre-cleaning, such as washing/degreasing, of a metal surface before the surface is immersed into a corrosive solution, and also requires washing treatment for washing off chemical solutions used as well as waste liquid treatment. These, disadvantageously, results in poor manufacturing efficiency.

The present invention is made in view of these problems. An object of the present invention is to provide a method for manufacturing a composite member, in which a composite member having a high joining strength can be manufactured in an inexpensive and efficient way; and the composite member.

To achieve the above object, the method for manufacturing a composite member according to the present invention includes joining a metal member with a resin-containing member by heating the metal member while pressing the resin-containing member against a metal porous film formed on a surface of the metal member.

A composite member according to the present invention has a metal member, a porous film formed on a surface of the metal member, and a resin-containing member provided on the porous film in the side opposite to the metal member, in which the metal member and the resin-containing member are joined together by allowing a portion of the resin-containing member to enter into voids of the porous film.

The method for manufacturing a composite member according to the present invention can suitably manufacture a composite member according to the present invention. In the method for manufacturing a composite member according to the present invention, the resin-containing member can be melted or softened by heating the metal member so that the resin-containing member enters into voids of the porous film. In this case, the voids of the porous film are not oriented in one direction in contrast to holes formed by laser irradiation. This enables manufacture of a composite member having high joining strength in which the resin-containing member is not easily exfoliated.

In the method for manufacturing a composite member according to the present invention, a porous film may be formed by any methods, but in particular, the porous film is preferably formed by impacting a surface of the metal member with metal powder using the cold spray process. The cold spray process enables formation of a porous film having a large number of pores, in which metal powder as a raw material is well joined together with little oxidation or degradation of the metal powder. In addition, use of the cold spray process for forming the porous film does not require expensive equipment as in the case when laser irradiation is used. Therefore, a composite member can be manufactured inexpensively. Moreover, the porous film 12 can be formed in a short time on a large area of a surface by the cold spray process, and washing treatment and waste liquid treatment are not required as in the case when chemical etching treatment is used. Therefore, a composite member can be manufactured efficiently in a short time.

The metal member and the porous film used in the method for manufacturing a composite member and the composite member according the present invention may be made of the same metal, or may be made of different metals. The metal member may be made of any metal, for example, may be made of aluminum or an aluminum alloy. The porous film may be made of any metal such as aluminum, an aluminum alloy, stainless steel, titanium, a titanium alloy, or the like, but is preferably made of titanium or a titanium alloy if it is formed by the cold spray process. In this case, a titanium powder or a titanium alloy can be used as the metal powder to form a robust porous film.

The method for manufacturing a composite member according to the present invention may include: heating the metal member by friction while pressing the metal member against the resin-containing member in a state where the resin-containing member is in contact with the porous film. In this case, friction stir welding (FSW), for example, can be used to join the metal member with the resin-containing member by pressing and rotating a cylindrical joining tool placed on a surface of the metal member in the side opposite to the porous film.

The resin-containing member used in the method for manufacturing a composite member and the composite member according to the present invention may be composed of any substance depending on the desired properties and applications. For example, it may include a thermoplastic resin material or a green thermosetting resin material. Alternatively, the resin-containing member may consist only of a resin, or may be partly resinous. When the resin-containing member include a thermoplastic resin material, the metal member is preferably heated at a temperature lower than the melting point of the thermoplastic resin material. In this case, they may be joined together without melting the resin-containing member, leading to relatively easy manufacture of a composite member. Thermoplastic resin materials include, for example, high-strength PEEK (polyether ether ketone), PA6 (polyamide 6), or the like. When the resin-containing member include a green thermosetting resin material, the metal member is preferably heated at a temperature higher than the melting point of the thermosetting resin material. In this case, the resin-containing member may be composed of a thermosetting member having a fibrous reinforcing material and a resin, such as, for example, a prepreg material.

For the method for manufacturing a composite member and the composite member according to the present invention, the porous film preferably has a porosity of 4% or more, and preferably has a porosity of 30% or less. Further, the porous film preferably has a film thickness of 25 μm or more, and preferably has a film thickness of 280 μm or less. In these cases, the strength of the joining region between the metal member and the resin-containing member can be increased, and thus the metal member is resistant to separation from the resin-containing member joined together. Moreover, the porous film preferably has a porosity of 6% or more, and more preferably has a porosity of 27% or less. Furthermore, the porous film preferably has a film thickness of 35 μm or more, and preferably has a film thickness of 150 μm or less. In these cases, the strength of the porous film can be further increased, and thus the metal member is particularly resistant to separation from the resin-containing member joined together.

The present invention can provide a method for manufacturing a composite member having a high joining strength in an inexpensive and efficient way, and the composite member.

DETAILED DESCRIPTION OF THE INVENTION

Hereinafter, embodiments of the present invention will be described with reference to Figures, Examples, and the like.

FIGS. 1 to 14 show the methods of manufacturing a composite member and the composite members therefrom according the embodiments of the present invention.

Figure 1:
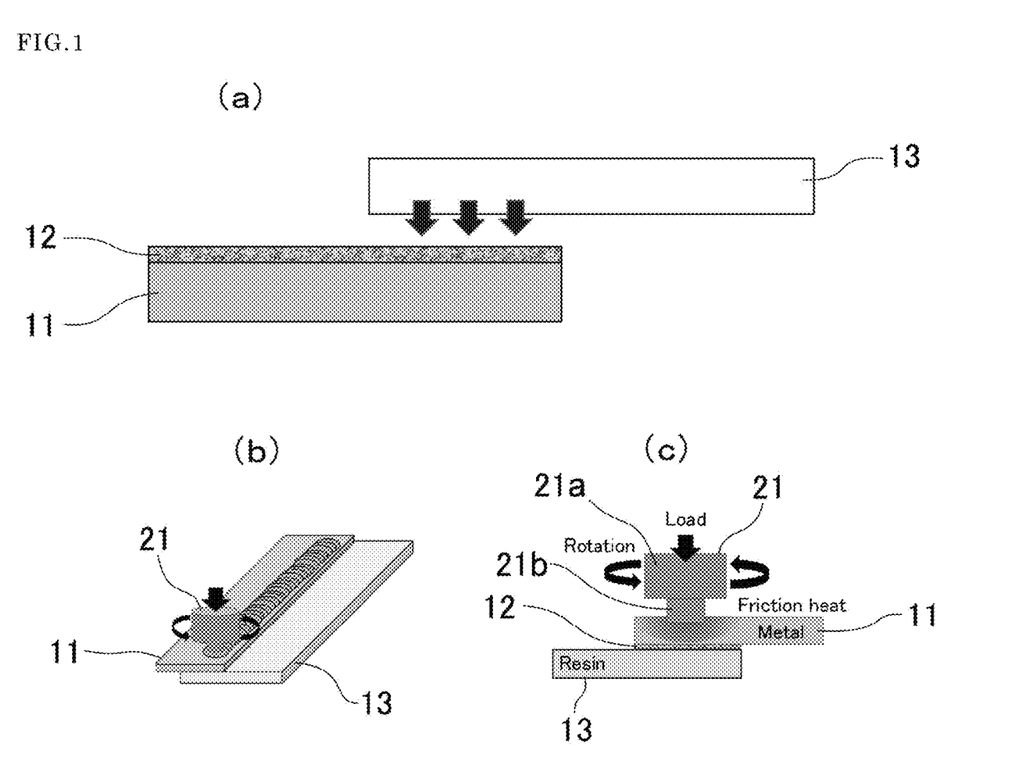
FIG. 1 shows (a) a side view illustrating a method of joining a metal member with a resin-containing member by pressing the resin-containing member against the metal member and heating the metal member with a heater or the like, (b) a diagrammatic perspective view illustrating a method of joining a metal member with a resin-containing member by heating the metal member by frictional heat using friction stir welding (FSW), and (c) a side view illustrating the joining method of (b), for the method for manufacturing a composite member according to an embodiment of the present invention.

As shown in FIG. 1, a porous film 12 is firstly formed on a surface of a metal member 11 in the method for manufacturing a composite member according an embodiment of the present invention. To this end, there is no particular limitation for a method of forming the porous film 12, but in a specific example shown in FIG. 1, the porous film 12 is formed by impacting a surface of the metal member 11 with metal powder using the cold spray process. Preferably, the metal member 11 is plate-shaped and has a surface on which the porous film 12 is to be formed.

The metal member 11 and the porous film 12 may be made of the same metal or may be composed of different metals. The metal member 11 may be composed of any metal. For example, it is composed of aluminum or an aluminum alloy. The porous film 12 may also be composed of any metal. For example, a titanium powder or a titanium alloy powder may be used as the metal powder to form a robust porous film 12 made of titanium or a titanium alloy by the cold spray process.

After forming the porous film 12, the metal member 11 and a resin-containing member 13 are joined together by heating the metal member 11 while pressing the resin-containing member 13 against it. To this end, the resin-containing member 13 may be composed of any substance depending on the desired properties and applications. Alternatively, the resin-containing member 13 may consist only of a resin, or may be partly resinous. The resin-containing member 13 may be composed of a thermoplastic resin material, for example, such as high-strength PEEK (polyether ether ketone) or PA6 (polyamide 6), or may be composed of a thermosetting member having a fibrous reinforcing material and a resin, such as a prepreg material.

There is no particular limitation for a method of heating the metal member 11. For example, the following methods may be used: a method including heating the metal member 11 with a heater or the like while pressing the resin-containing member 13 against it as shown in FIG. 1(a); a method including heating the metal member 11 with friction heat by pressing and rotating a cylindrical joining tool 21 against a surface of the metal member 11 opposite to the porous film 12 using friction stir welding (FSW) while the resin-containing member 13 is in contact with the porous film 12, as shown in FIGS. 1(a) and (b). It is noted that the joining tool 21 for friction stir welding, which is generally shaped to have a protruded probe 21b at the central region of a cylindrical shoulder 21a, is preferably configured such that the amount of protrusion of the probe 21b is very small to prevent deformation of the metal member 11 and to make the joining interface as flat as possible.

Heating the metal member 11 in this way can melt or soften the resin-containing member 13 to allow the resin-containing member 13 to enter into voids of the porous film 12. This enables manufacture of a composite member according to an embodiment of the present invention, the composite member having the metal member 11 and the resin-containing member 13 joined together. It is noted that in the case where the resin-containing member 13 includes a thermoplastic resin material, the metal member 11 may be heated at a temperature lower than the melting point of the resin-containing member 13. Thereby, the resin-containing member 13 can be joined without melting the resin-containing member 13, leading to manufacture of a composite member with relative ease.

In the method for manufacturing a composite member according an embodiment of the present invention, the cold spray process enables formation of a porous film 12 having a large number of pores, in which metal powder as a raw material is well joined together with little oxidation or degradation of the metal powder. The voids of the porous film 12 are not oriented in one direction in contrast to holes formed by laser irradiation. This enables manufacture of a composite member having a high joining strength in which the resin-containing member 13 is not easily exfoliated.

In addition, use of the cold spray process for forming the porous film 12 does not require expensive equipment as in the case when laser irradiation is used. Therefore, a composite member can be manufactured inexpensively. Moreover, the porous film 12 can be formed in a short time on a large area of a surface by the cold spray process, and washing treatment and waste liquid treatment are not required as in the case when chemical etching treatment is used. Therefore, a composite member can be manufactured efficiently in a short time.

Example 1

After forming a porous film 12 by the method for manufacturing a composite member according to an embodiment of the present invention as shown in FIGS. 1(b) and (c) using the cold spray process, a metal member 11 and a resin-containing member 13 were joined together using friction stir welding (FSW). A rolled material of an A5052 aluminum alloy was used as the metal member 11. The metal member 11 has a rectangular plate-like shape elongated in the rolling direction, and has the dimensions of 200 mm long, 50 mm wide, and 5 mm thick. The metal member 11 also has one surface (joining surface) roughened by injecting an alumina powder (particle diameter φ600 to 700 μm (#40), φ200 to 250 μm (#60), 90 μm to 120 μm (#120)) to the surface at a pressure of 0.3 MPa. PEEK, a thermoplastic resin material, was used as the resin-containing member 13. The resin-containing member 13 has a rectangular plate-like shape, and has the dimensions of 200 mm long, 50 mm wide, and 5 mm thick.

A low-pressure cold spray apparatus (KM-CDS 3.0, INO-VATI) was used to form the porous film 12 by the cold spray process. Metal powders shown in Table 1 were used in the cold spray process. Table 1 also shows film-forming conditions [the presence or absence of pretreatment (Blast), powder feed rates (Powder feed rate), the pressures of compressed gas (Gas pressure), the temperatures of process gas (Gas temp.), and traverse rates of spray nozzles (Traverse speed)] for each metal powder.

TABLE 1

| Powder | Blast | Powder feed rate [g/min] | Gas pressure [kPa] | Gas temp. [° C.] | Traverse speed [min/s] |
|---|---|---|---|---|---|
| Al | Yes | 4.8 | 450 | 205 | 100 |
| SUS316L | Yes | 4.8 | 620 | 250 | 120 |
| Ti-45 | Yes | 5.0 | 620 | 427 | 200 |
|  | No | 5.0 | 620 | 427 | 100, 100 (2 pass) |
|  | Yes | 4.0-5.5 | 620 | 427 | 100, 120, 250, 400, 500, 700, 900 |
|  | No | 4.0-5.5 | 620 | 427 | 120, 250, 400, 700 |
| Ti-20 + Ti-45 | Yes | 5.0 | 620 | 427 | 150, 200, 400, 700 |
| Ti-20 + Al$_2$O$_3$ | Yes | 5.5 | 620 | 427 | 100, 250 |
|  | No | 5.5 | 620 | 427 | 200 |

It is noted that blast treatment (Blast) was performed as a pretreatment on a joining surface of the metal member 11 with alumina particles (#24) after the roughening treatment. He gas was used as the process gas. To control the porosity and thickness of the porous film 12, the traverse speed was varied as shown in Table 1. In some cases, heat treatment was performed after film formation to increase adhesion between the metal member 11 and the porous film 12. Heat treatment was performed in an electric muffle furnace under the air atmosphere. The heat-treatment temperature and the holding time were 500° C. and 30 min, respectively for the Al powder, and 600° C. and 4 hours, respectively for the Ti-20, Ti-45, Ti-20+Ti-45, and Ti-20+Al$_2$O$_3$ powders (600° C. and 2 or 14 hours in some cases for only Ti-20), all of which were air-cooled.

A high-stiffness friction stir welding machine (TU-01 from Nitto Seiki Co., Ltd.) was used to join the metal member 11 with the resin-containing member 13. The overlap width between the metal member 11 and the resin-containing member 13 was set to 20 mm, and a joining tool of SKD61 was used as a joining tool 21. The joining tool 21 includes a cylindrical shoulder 21a having a tool diameter of 15 mm and a probe 21b having a diameter of 5 mm, in which the probe 21b is protruded by 1.4 mm from the central region of the cylindrical shoulder 21a. At the time of joining, the traverse speed of the joining tool 21 was set to 10.0 mm/s, and the rotational speed of the joining tool 21 was set to 1200 rpm, and the insertion depth of the joining tool 21 into the metal member 11 was set to 1.1 mm, and the advancing angle of the joining tool 21 was set to 3°.

Figure 2:
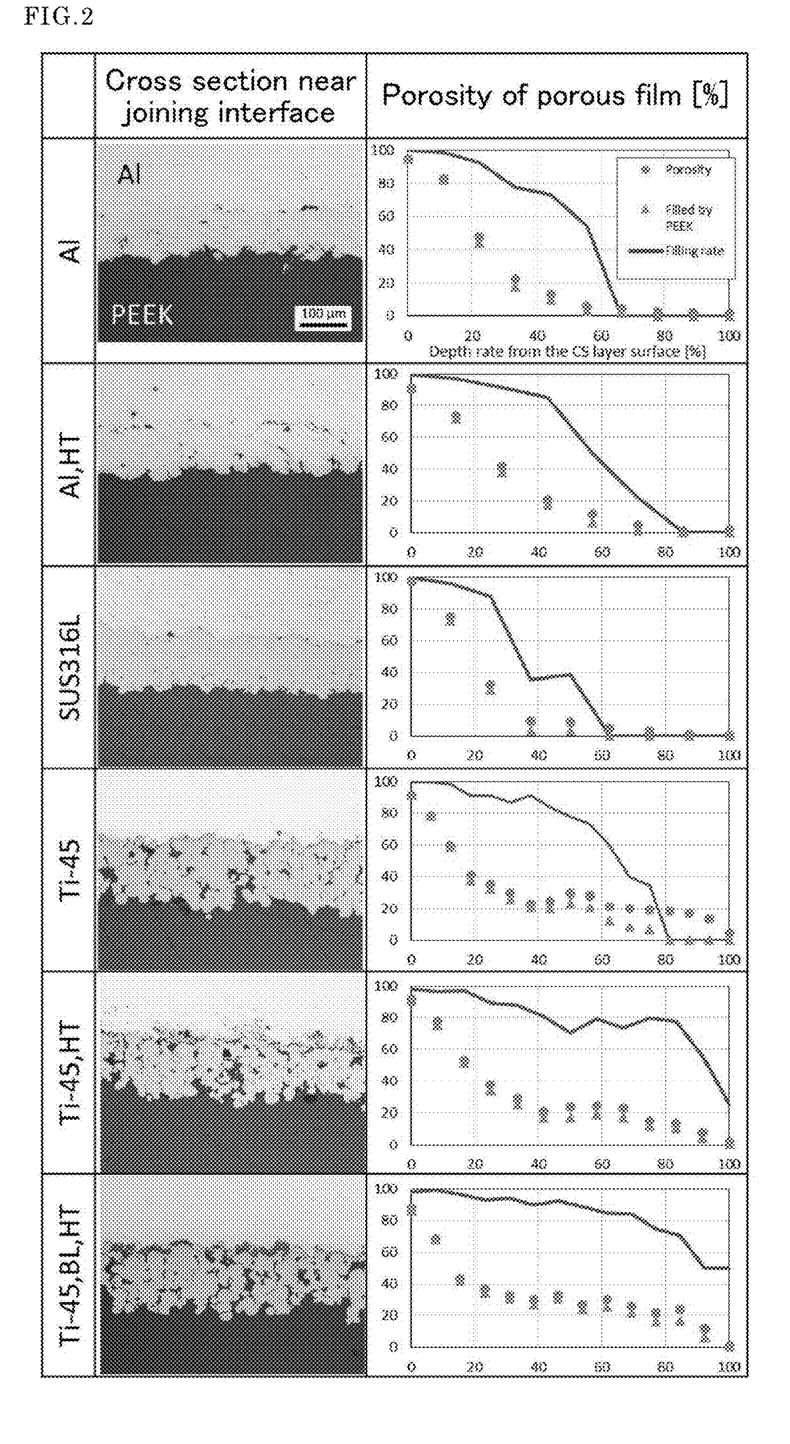
FIG. 2 shows optical micrographs (left) of cross sections near the joining interfaces; and graphs (right) for the porosities of porous films (Porosity), the porosities of porous films filled with resin-containing materials (Filled by PEEK), and the filling rates of resin-containing materials (Filling Rate) for each of metal powders and film-forming conditions of the porous films used for forming porous films of composite members produced by the method for manufacturing a composite member according to an embodiment of the present invention.
Figure 3:
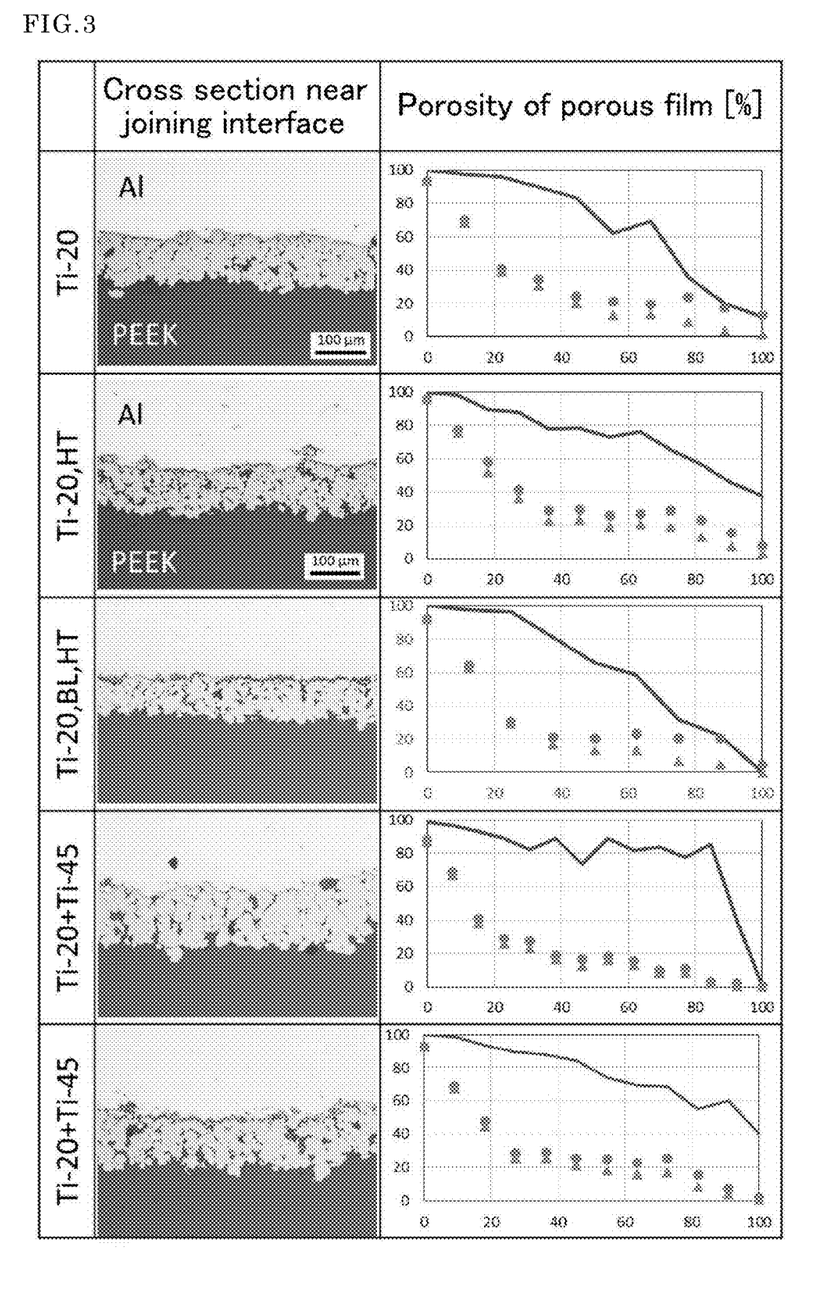
FIG. 3 shows optical micrographs (left) of cross sections near the joining interfaces; and graphs (right) for the porosities of porous films (Porosity), the porosities of porous films filled with resin-containing materials (Filled by PEEK), and the filling rates of resin-containing materials (Filling Rate) for each of metal powders and film forming conditions of the porous films used for forming porous films of composite members produced by the method for manufacturing a composite member according to an embodiment of the present invention.
Figure 4:
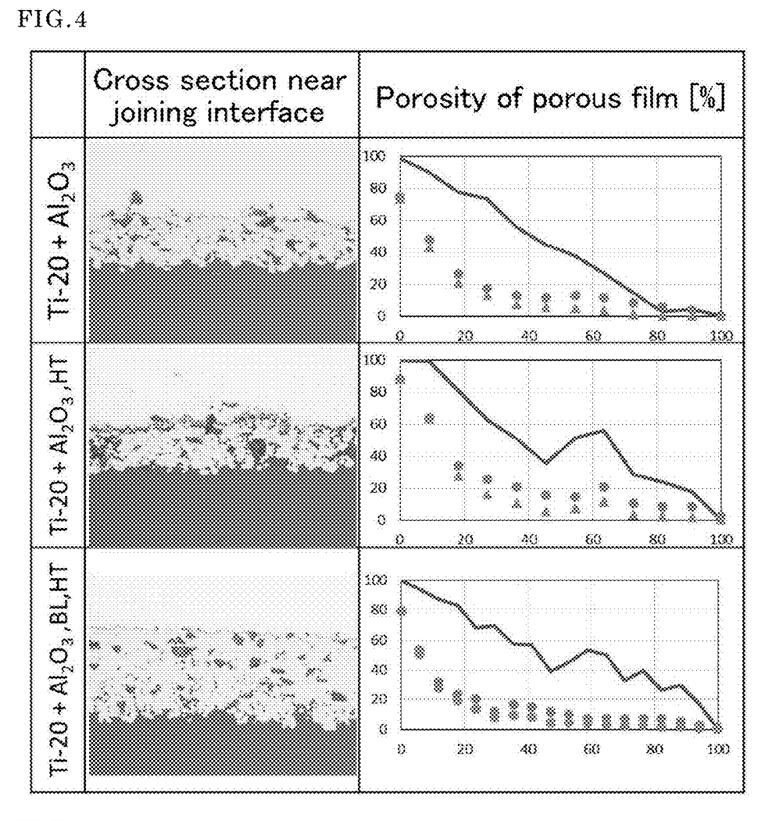
FIG. 4 shows optical micrographs (left) of cross sections near the joining interfaces; and graphs (right) for the porosities of porous films (Porosity), the porosities of porous films filled with resin-containing materials (Filled by PEEK), and the filling rates of resin-containing materials (Filling Rate) for each of metal powders and film forming conditions of the porous films used for forming porous films of composite members produced by the method for manufacturing a composite member according to an embodiment of the present invention.

Optical micrographs of cross sections near the joining interfaces of composite members each produced by forming a porous film 12 using one of the metal powders listed in Table 1 and joining a metal member 11 (Al alloy) with a resin-containing member 13 (PEEK) are shown left in FIGS. 2 to 4 for each of the metal members and the film-forming conditions of the porous films 12. It is noted that the term "HT" refers to a case where heat treatment was performed after the formation of the porous film 12. It is also noted that term "BL (Blast less)" refers to a case where blast treatment was not performed before the film formation of the porous film 12.

The porosity of each porous film 12 (Porosity) and the porosity of each porous film 12 filled with the resin-containing member 13 (Filled by PEEK) were determined from the corresponding optical micrograph in accordance with the point counting method, and the filling rate of the resin-containing member 13 (Filling rate) was calculated from the corresponding porosities. The results are shown in the corresponding graphs at the right side of FIGS. 2 to 4. The horizontal axis in each figure represents the percentage of the depth of the porous film 12 from a surface in the side of the resin-containing member 13, where 0% corresponds to the interface between the porous film 12 and the resin-containing member 13, and 100% corresponds to the interface between the porous film 12 and the metal member 11. Further, the mean thickness and mean porosity of each porous film 12 were determined from the corresponding optical micrograph. The results are shown in Table 2.

TABLE 2

| Metal powder, Film-forming conditions | Film thickness of porous film [μm] | Average porosity of porous film [%] |
|---|---|---|
| Al | 95 | 7.8 |
| Al, HT | 100 | 8.7 |
| SUS316L | 120 | 6.9 |
| Ti-45 | 110 | 25.4 |
| Ti-45, HT | 80 | 26.9 |
| Ti-45, BL, HT | 90 | 25.6 |
| Ti-20 | 100 | 20.8 |
| Ti-20, HT | 100 | 21.1 |
| Ti-20, BL, HT | 80 | 26.0 |
| Ti-20 + Ti-45 | 110 | 19.7 |
| Ti-20 + Ti-45, HT | 80 | 26.6 |
| Ti-20 + Al$_2$O$_3$ | 110 | 11.9 |
| Ti-20 + Al$_2$O$_3$, HT | 80 | 13.7 |
| Ti-20 + Al$_2$O$_3$, BL, HT | 100 | 12.7 |

As shown in FIGS. 2 to 4 and Table 2, it was observed that voids present inside the porous film 12 were filled with the resin-containing material 13 to some extent, and even a porous film 12 having a small porosity, such as SUS316L, for example, was filled with the resin-containing member 13. It was also observed that the filling rate gradually decreased as the distance of the porous film 12 from the surface in the side of the resin-containing member 13 increased. This suggests that there is a certain limit in the filling depth of the resin-containing material 13.

It is noted that, for comparison, the metal member 11 and the resin-containing member 13 (PEEK) were joined together by friction stir welding without forming the porous film 12 using a rolled material of an A5052 aluminum alloy (not roughened nor pretreated). The results demonstrated that the resin-containing member 13 exfoliated from the metal member 11 immediately after joining, and thus almost no joining was able to be achieved.

Figure 5:
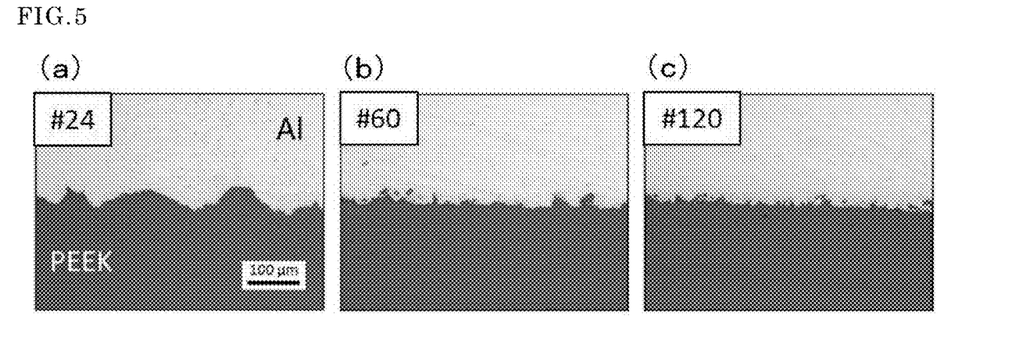
FIG. 5 shows optical micrographs of cross sections near the joining interfaces of composite members produced by blast treatment alone without forming porous films, as prepared in Comparative Examples of the method for manufacturing a porous member according to an embodiment of the present invention. The following alumina particles were used for the blast treatment: (a) #24, (b) #60, and (c) #120.

Further, for comparison, a composite member was produced by joining the metal member 11 with the resin-containing member 13 (PEEK) by friction stir welding without forming the porous film 12 using a rolled material of an A5052 aluminum alloy having a surface blasted with alumina particles (#24, #60, or #120). Optical micrographs of cross sections near the joining interfaces of these composite members are shown in FIG. 5. As shown in FIG. 5, it was observed that the insides of minute uneven structures on the surface of the metal member 11 formed by the blast treatment were filled with the resin-containing member 13, and the metal member 11 tightly adhered to the resin-containing member 13 without gaps.

Next, the composite members produced were each subjected to tensile shear tests. The tests were conducted using a universal testing machine (INSTRON) at a crosshead speed of 1.0 mm/min under room temperature. Test strips having a width of 20 to 25 mm were used for the tests. The test strips were cut out from each composite member perpendicularly to the joining direction. Specifically, 3 test strips were cut out from each of the composite materials, and each of the strips was subjected to the tensile shear test. Values obtained from dividing the resulting breaking loads by joining areas were averaged to obtain a tensile shear strength of each composite material. The resulting tensile shear strengths of the composite materials are each shown in Table 3.

TABLE 3

| Metal powder, Film-forming conditions | Tensile shear strength [MPa] |
| --- | --- |
| Al | 9.62 |
| Al, HT | 10.5 |
| SUS316L | 13.1 |
| Ti-45 | 12.0 |
| Ti-45, HT | 13.6 |
| Ti-45, BL, HT | 13.0 |
| Ti-20 | 15.5 |
| Ti-20, HT | 15.3 |
| Ti-20, BL, HT | 13.2 |
| Ti-20 + Ti-45 | 15.8 |
| Ti-20 + Ti-45, HT | 14.6 |
| Ti-20 + $Al_2O_3$ | 15.5 |
| T1-20 + $Al_2O_3$, HT | 13.4 |
| Ti-20 + $Al_2O_3$, BL, HT | 12.6 |

For comparison, the same tensile shear tests were also conducted for the composite members without the porous films 12 shown in FIG. 5. The results demonstrated that the tensile shear strength ranged from 7.9 to 8.7 MPa, and the strength decreased as the surface smoothness of the metal member 11 increased. As shown in Table 3, it was observed that the composite members with the porous films 12 had tensile shear strengths of 9.62 to 15.8 MPa, which were higher than those of the composite members without porous films 12.

Observation of fracture surfaces after the tensile shear tests revealed that those having the porous films 12 formed with the Al, Ti-20, Ti-45, Ti-20+Ti-45, and Ti-20+$Al_2O_3$ powders broke at the interfaces between the metal members 11 and the porous films 12. It was also observed that one having the porous film 12 formed with the Ti-45 powder and subjected to heat treatment broke inside the porous film 12. It was further observed that those having the porous films 12 formed with powders other than the Ti-45 powder and subjected to heated treatment, and formed with the SUS316L powder broke at the interfaces between the porous films 12 and the resin-containing films 13.

Figure 6:
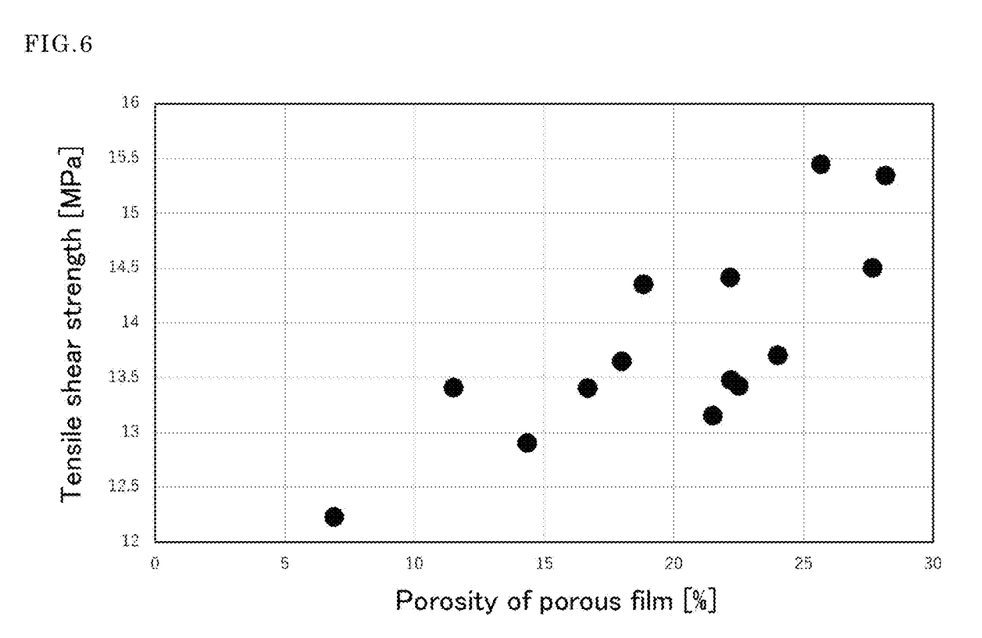
FIG. 6 is a graph showing the relation between the porosities of porous films and the tensile shear strengths of composite members produced by the method manufacturing a porous member according to an embodiment of the present invention.

The relation between the porosity of the porous film 12 and the tensile shear strength of a composite member was determined for the composite members that broke at the interfaces between the porous films 12 and the resin-containing members 13 during the tensile shear tests. The results are shown in FIG. 6. As shown in FIG. 6, it was observed that the tensile shear strength gradually increased as the porosity increased. It was also observed that a tensile shear strength of about 12 MPa was achieved even at a porosity of about 6.8%, demonstrating that sufficiently high strength was obtained.

Figure 7:
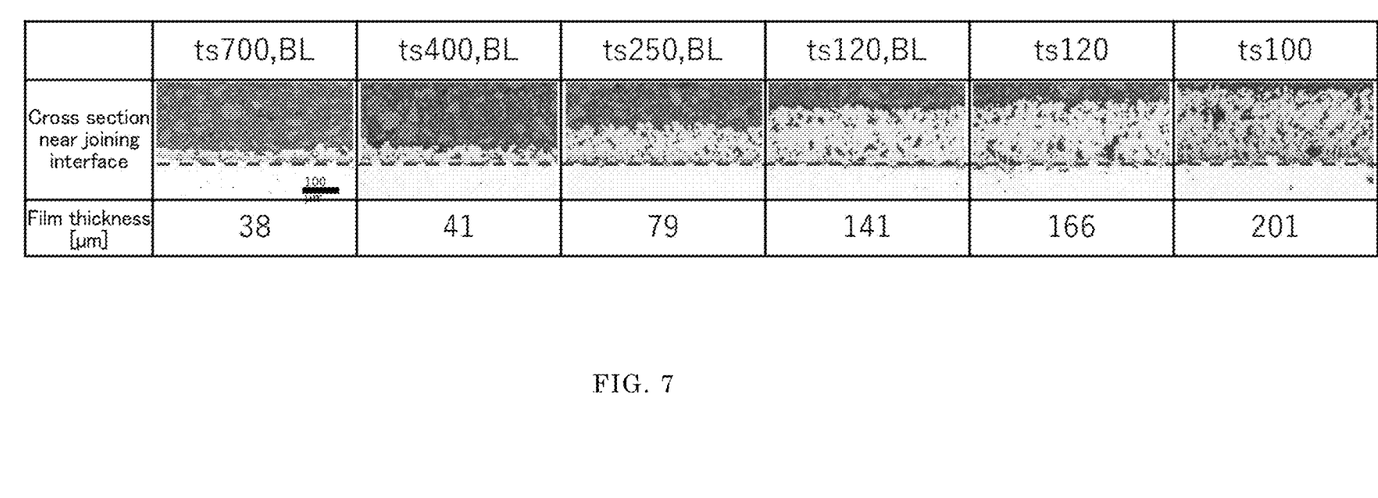
FIG. 7 shows optical micrographs of cross sections near the joining interfaces and the film thicknesses of porous films for each of the traverse speed (ts) during the formation of porous films and the presence or absence of the blast treatment, for composite members produced by the method manufacturing a composite member according to an embodiment of the present invention.

Next, in order to investigate the relation between the film thickness and the strength of the porous film 12, composite members having the porous films 12 formed the Ti-20 powder at various traverse speeds (Traverse speed; ts) and subjected to heat treatment after film formation were measured for the tensile shear strength. It is noted that measurements were performed for composite members having the metal members 11 subjected to blast treatment as pretreatment and composite members having the metal members 11 not subjected to blast treatment. The film thicknesses of the porous films 12 were also varied by varying the traverse speeds. Optical micrographs of cross sections near the joining interfaces and the film thicknesses of the porous films 12 of the composite members for which measurements were performed are shown in FIG. 7. In addition, the relation between the film thickness of the porous film 12 and the tensile shear strength is shown in FIG. 8.

Figure 8:
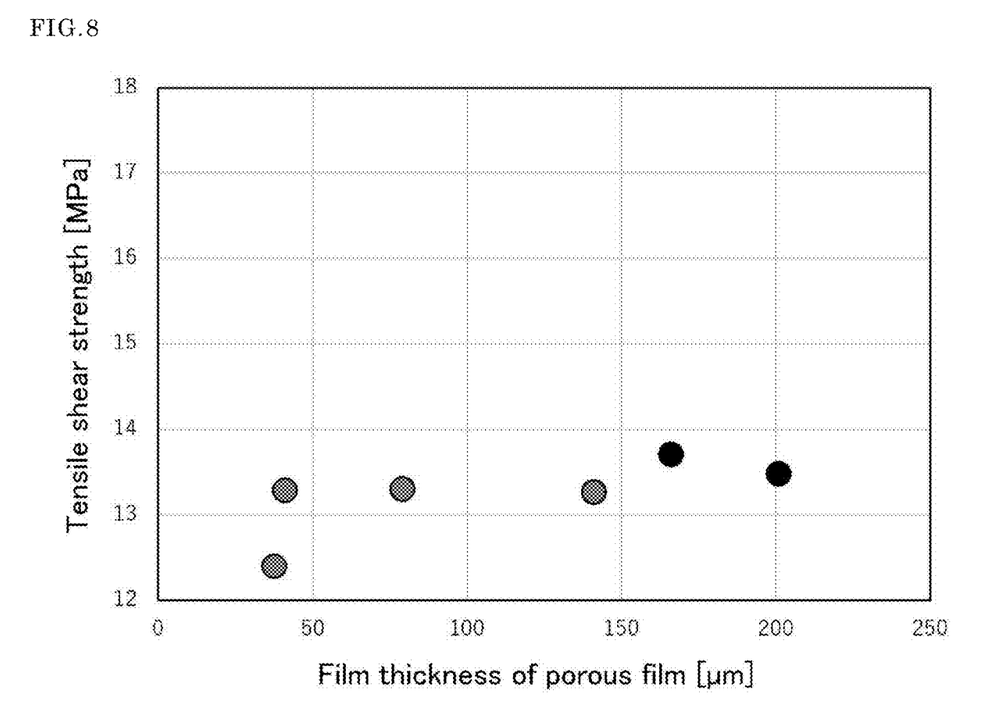
FIG. 8 is a graph showing the relation between the film thicknesses of porous films and the tensile shear strengths for the composite members shown in FIG. 7.

As shown in FIGS. 7 and 8, it was observed that the tensile shear strength increased as the film thickness of the porous film 12 increased, but the strength reached a certain saturation at a certain film thickness. It was also observed that even a porous film 12 having a film thickness of 38 μm had a tensile shear strength of 12 MPa or more, demonstrating that it has a sufficiently high strength.

Figure 9:
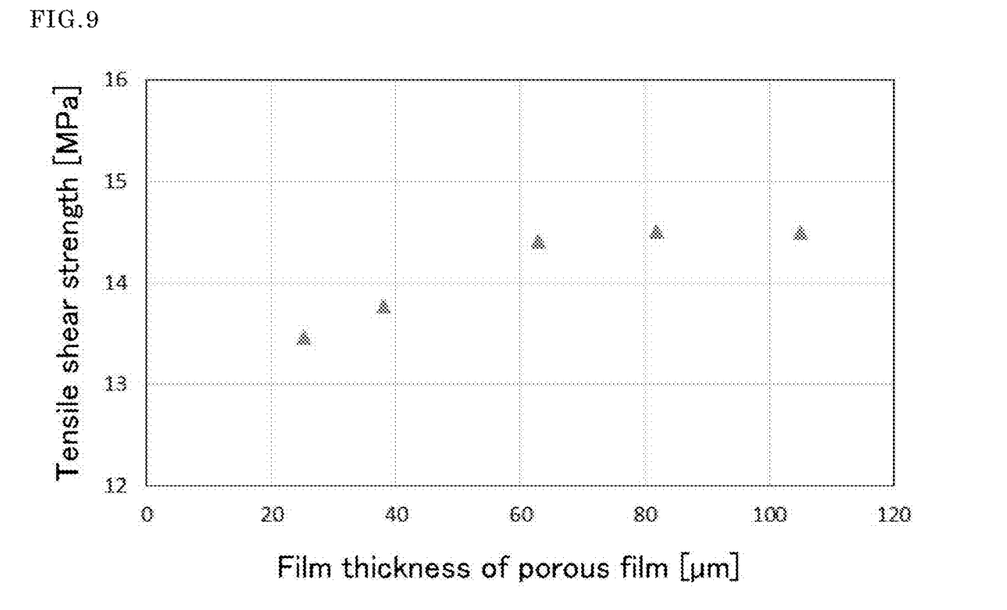
FIG. 9 is a graph showing the relation between the film thicknesses of porous films and the tensile shear strengths for composite members having larger porosities than those shown in FIG. 7, which were produced by the method for manufacturing a composite member according to an embodiment of the invention.

To investigate the influence of different porosities of the porous films 12 on the relation between the film thicknesses of the porous films 12 and the strengths, composite members were measured for the tensile shear strength as in FIGS. 7 and 8, the composite members having the porous films 12 formed with the Ti-20+Ti-45 powder at various traverse speeds and subjected to heat treatment after film formation. The relation between the film thickness of the porous film 12 and the tensile shear strength is shown in FIG. 9. It is noted that the porous films 12 formed with the Ti-20+Ti-45 powder have larger porosities than those formed with the Ti-20 powder.

As shown in FIG. 9, it was observed that the tensile shear strength increased as the film thickness of the porous film 12 increased, but the strength reached a certain saturation at a certain film thickness as in FIG. 8. However, it was observed that the strength at saturation was higher as compared with that in FIG. 8, and the film thickness corresponding to the strength at saturation was also larger. This may be because the shear strength of the resin-containing member 13 increases as the porosity increases.

Comparative Example: Laser Irradiation

A composite member was produced by forming a large number of pores on a surface of the metal member 11 by laser irradiation; filling the surface of the metal member 11 with a molten resin by hot pressing; and cooling and solidifying the resin, as described in Nonpatent Literature 4. A Ti alloy was used as the metal member 11, and PEEK was used as the resin. The diameter of the laser-irradiated pores was set to about 270 μm, and the temperature for the hot pressing was set to 300° C. Optical micrographs of cross sections near the joining interfaces of composite members in which the area percentage of pores on the metal member 11 was 40% and 70% are shown in FIGS. 10(*b*) and (*c*), respectively.

It is noted that for comparison, a composite member was produced having the metal member 11 subjected to surface treatment of blasting with alumina particles (250 μm in diameter) without laser irradiation. FIG. 10(*a*) shows an optical micrograph of a cross section near the joining interface of the composite member. As shown in FIGS. 10(*a*) to (*c*), it was observed that the insides of unevenness and pores on the surface of the metal member 11 were filled with a resin for all of the composite members, and the metal members 11 tightly adhered to the resin without gaps. Further, as shown in FIGS. 10(*b*) and 10(*c*), it was observed that the pores formed by laser irradiation extend only in the direction perpendicular to the surface of the metal member 11.

Figure 10:
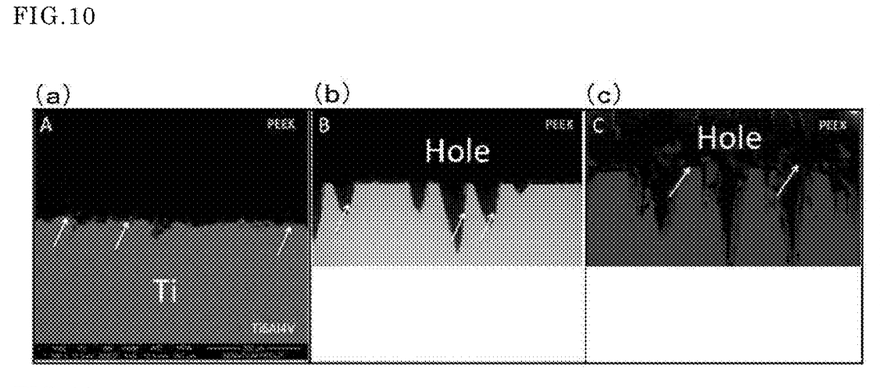
FIG. 10 shows optical micrographs of cross sections near the joining interfaces of composite members produced by filling surfaces of metal members with a molten resin by hot pressing without forming a porous film in Comparative Examples of the method for manufacturing a porous member according to an embodiment of the present invention: (a) a metal member subjected to blast treatment, (b) a metal member with pores formed at an area percentage of 40% by laser irradiation, and (c) a metal member with pores formed at an area percentage of 70% by laser irradiation.

The composite members shown in FIGS. 10(*a*) to 10(*c*) were subjected to tensile shear tests as in Example 1. The results showed that the tensile shear strength was 11 MPa, 25 MPa, and 51 MPa for a composite member shown in FIG. 10(*a*) where blast treatment was performed, for a composite member shown in FIG. 10(*b*) where the area percentage of pores by laser irradiation was 40%, and for a composite member shown in FIG. 10(*c*) where the area percentage of pores by laser irradiation was 70%, respectively. Comparison of these results with those shown in Table 3 can reveal that the composite members prepared by laser irradiation have larger tensile shear strength than those having the porous films 12 formed by the cold spray process. However, a composite member prepared by laser irradiation suffers from weak sticking of resin in the direction perpendicular to a surface of the metal member 11 because holes formed by laser irradiation extend only in the direction perpendicular to the surface of the metal member 11 as shown in FIGS. 10(*b*) and (*c*). This suggests that the composite member prepared by laser irradiation is more susceptible to exfoliation than one having the porous film 12 formed by the cold spray process.

Example 2

A rolled material of an A5052 aluminum alloy was used as the metal member 11, and a thermoplastic resin material PA6 was used as the resin-containing member 13 to form the porous film 12 using the cold spray process by the method of manufacture of a composite member according to an embodiment of the present invention as shown in FIGS. 1(*b*) and (*c*), and then the metal member 11 was joined with the resin-containing member 13 by friction stir welding (FSW). A Ti powder was used in the cold spray process. In the friction stir welding, the traverse speed of the joining tool 21 was set to 13 mm/s, and the rotational speed of the joining tool 21 was set to 1000 rpm, and the insertion depth of the joining tool 21 into the metal member 11 was set to 1.0 mm. Other manufacturing conditions were as in Example 1.

The resulting composite member was subjected to tensile shear strength tests as in Example 1. The results showed that the tensile shear strength was 10 MPa, which was higher than those of the composite members without the porous films 12 as shown in FIG. 5. It is noted that the porous film 12 of the produced composite member had a film thickness of about 130 μm.

Example 3

A rolled material of an A5052 aluminum alloy was used as the metal member 11, and PA6 was used as the resin-containing member 13 to form the porous film 12 using the cold spray process by the method of manufacture of a composite member according to an embodiment of the present invention as shown in FIG. 1A, and then the metal member 11 was joined with the resin-containing member 13 by heating the metal member 11 while pressing the resin-containing member 13 against it. The resin-containing member 13 was pressed against the metal member 11 by hand press. A temperature at which the metal member 11 was heated was 300° C.

The resulting composite member was subjected to tensile shear strength tests as in Example 1. The results showed that the tensile shear strength was 7 MPa or more. It is noted that the porous film 12 of the produced composite member had a film thickness of about 270 μm.

Example 4

Figure 11:
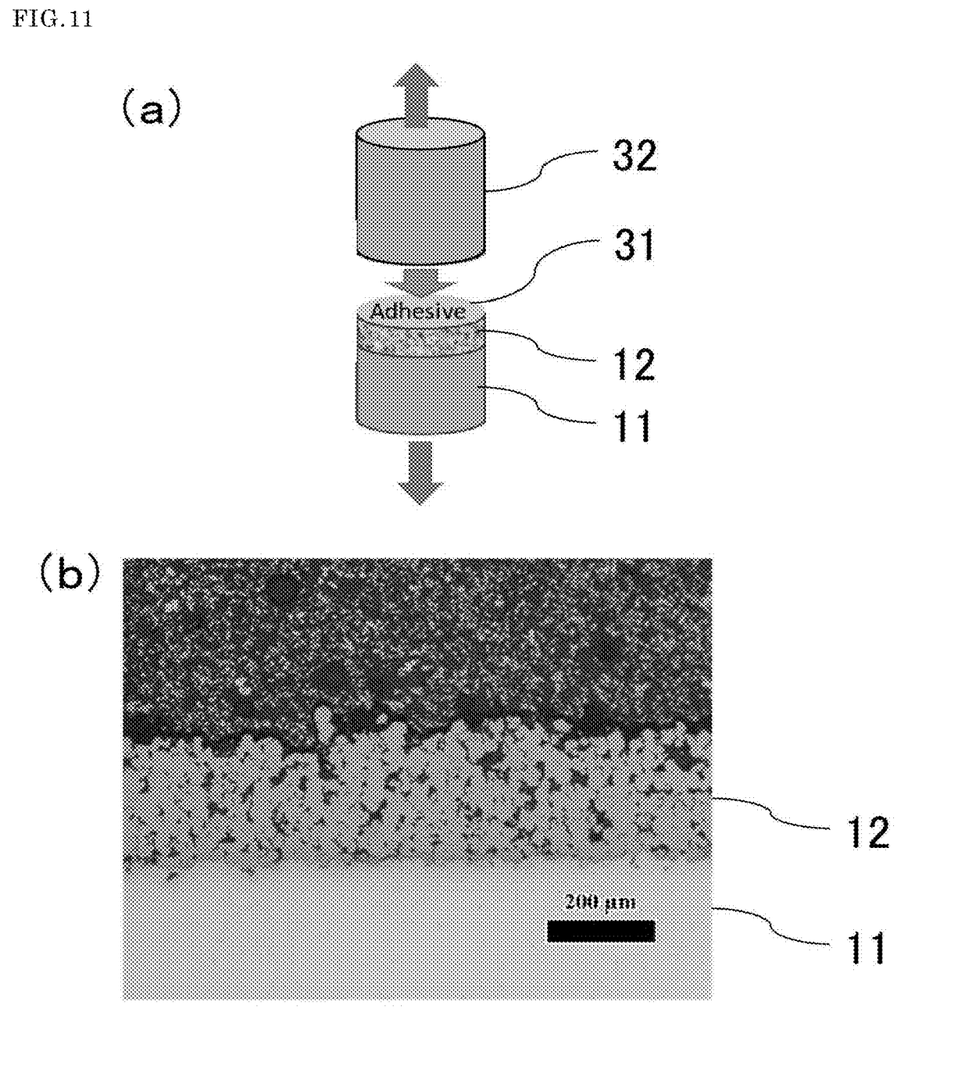
FIG. 11 shows (a) a diagrammatic perspective view illustrating a testing method for tensile tests to investigate the strength of a porous film, (b) an optical micrograph of a cross section of a porous film formed for the tensile tests with regard to the method for manufacturing a composite member according to an embodiment of the present invention.

In order to investigate the relation between the thickness of the porous film 12 and the strength, the porous film 12 formed using the cold spray process by the method for manufacturing a composite member according to an embodiment of the present invention was subjected to tensile tests. As shown in FIG. 11(*a*), an A5052 aluminum alloy was used as the metal member 11 for the tensile tests. The metal member 11 has a cylindrical shape with a diameter of 25 mm and a length of 40 mm. In the cold spray process, a Ti-45 powder with a particle size of 1 to 45 μm was used at a compressed gas pressure of 620 kPa, a process temperature of 427° C., and a traverse speed of spray nozzles of 500 mm/s. The porous films 12 with various thicknesses were formed by varying the number of lamination layers in the cold spray process. The porosities of the porous films 12 are 6% or more for all. An example of an optical micrograph of a cross section of the porous film 12 formed on one surface of the metal member 11 is shown in FIG. 11(*b*).

As shown in FIG. 11(*a*), an adhesive (Adhesive) 31 was applied on a surface of each porous film 12 formed, and then a base material 32 made of an A5052 aluminum alloy having the same size as the metal member 11 was bonded for the tensile tests. For the adhesive 31, "3M (registered trademark) Scotch-Weld (registered trademark) DP-460 Off-White (3M Japan Limited)" was used. After bonded via the adhesive, the metal member 11 and the base material 32 were pulled to determine the tensile strength for each porous film 12. The results from the tensile tests are shown in FIG. 12.

Figure 12:
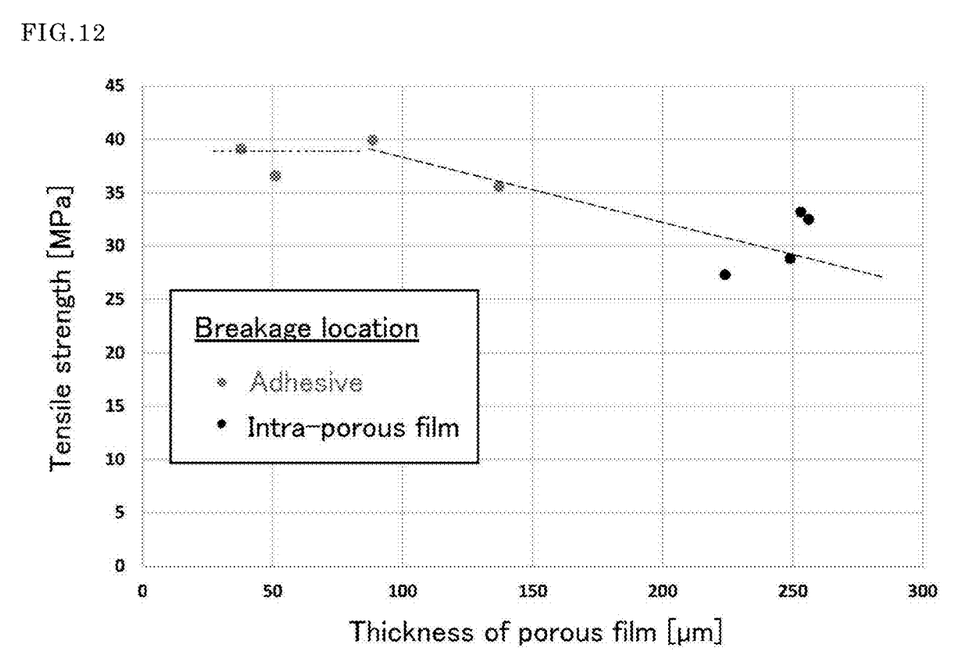
FIG. 12 is a graph showing the relation between the thicknesses of porous films and tensile strengths obtained from the tensile tests shown in FIG. 11(a).

As shown in FIG. 12, the results from the tensile tests revealed that the adhesive underwent internal breakage, and the tensile strength was 35 MPa or more when the porous film 12 had a thickness of 150 μm or less. It was also observed that the porous film 12 underwent internal breakage near the metal member 11, and the tensile strength was 35 MPa or less when the porous film 12 had a thickness of 150 μm or more. These results suggest that a porous film 12 of 150 μm or less has a strength of at least 35 MPa or more, and thus when a composite member is manufactured with that porous film 12, the metal member 11 and the resin-containing member 13 joined together are more resistant to separation.

Example 5

Figure 13:
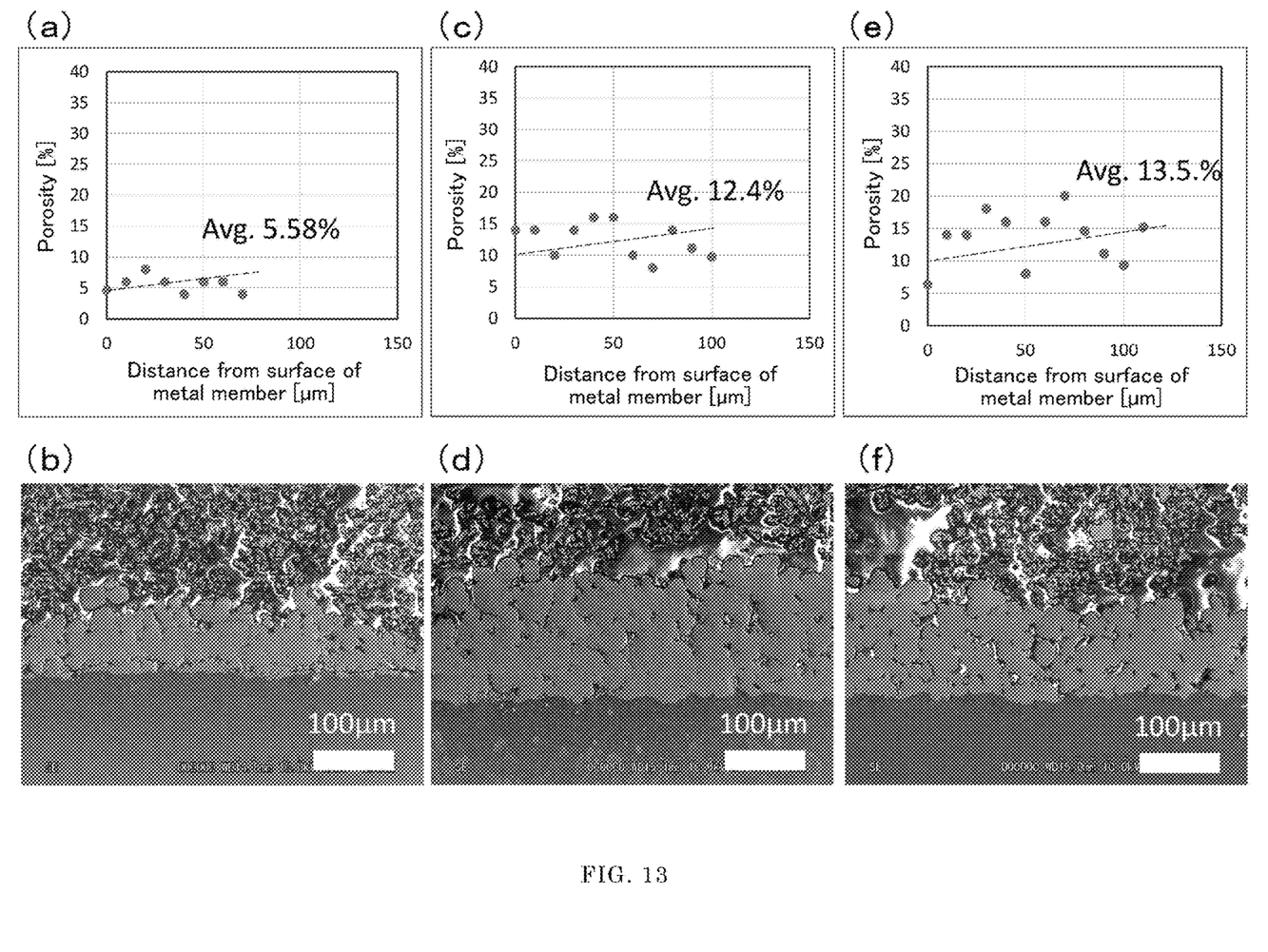
FIG. 13 shows (a) the distributions of the porosities of porous films and (b) a scanning electron micrograph of a cross-section of a porous film when the gas pressure of compressed gas at the time of injecting a metal powder in the cold spray process was 312 kPa; (c) the distributions of the porosities of porous films and (d) a scanning electron micrograph of a cross-section of a porous film at a gas pressure of 483 kPa; and (e) the distributions of the porosities of porous films and (f) a scanning electron micrograph of a cross-section of a porous film at a gas pressure of 620 kPa with regard to the method for manufacturing a composite member according to an embodiment of the present invention.

In order to investigate the relation between the porosity of the porous film 12 and the strength, the porous films 12 were formed and subjected to tensile tests as in Example 4. In the cold spray process, the porous films 12 with different porosities were formed using different gas pressures of compressed gas of 312 kPa, 483 kPa, and 620 kPa at the time of injecting metal powder. FIG. 13 shows the relation between the distance of the porous film 12 from the surface of the metal member 11 and the porosity; and a scanning electron micrograph of a cross section of the porous film 12 for each gas pressure.

As shown in FIG. 13, it was observed that the porosity of the porous membrane 12 was about 4% to about 9% with the average of 5.58% when the gas pressure was 312 kPa, and the porosity of the porous membrane 12 was about 8% to about 16% with the average of 12.4% when the gas pressure was 483 kPa, and the porosity of the porous membrane 12 was about 6% to about 20% with the average of 13.5% when the gas pressure was 620 kPa, demonstrating that the porosity of the porous film 12 increased as the gas pressure increased. This can be explained as follows. When the gas pressure is low, the colliding force of the metal powder is small. This does not allow large particles having large particle sizes to be joined, but only allows particles of the metal powder having small particle sizes to be deposited and fill gaps between the particles. In contrast, when the gas pressure is high, the colliding force of the metal powder is large. This allows large particles having large particle sizes to be joined, which, in turn, tends to leave gaps between these particles.

Figure 14:
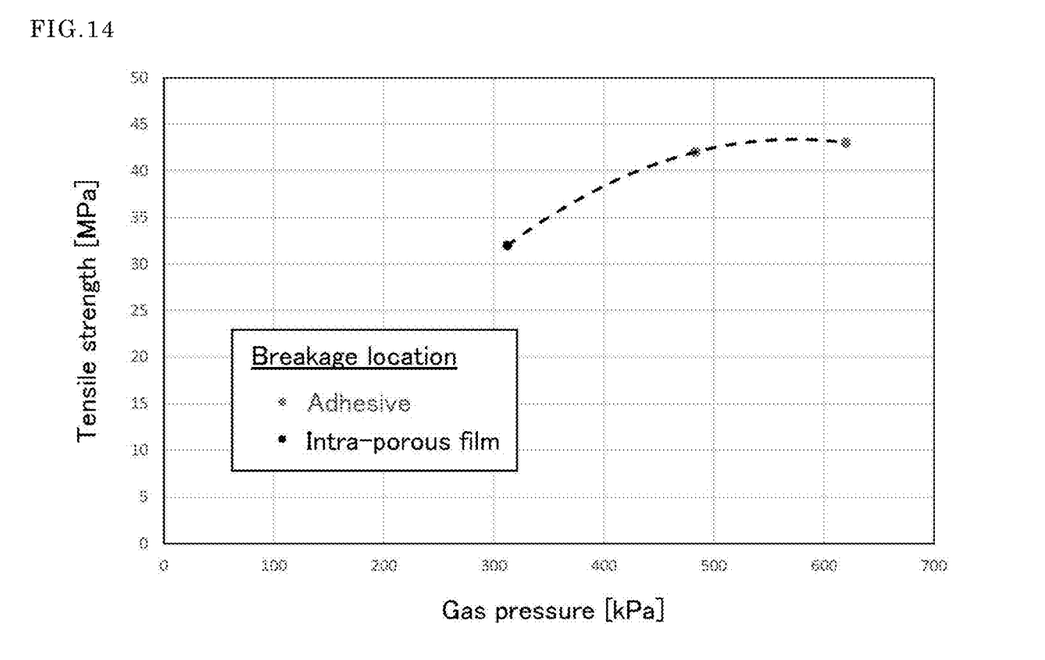
FIG. 14 is a graph showing the relation between the gas pressures of compressed gas at the time of injecting a metal powder in the cold spray process and the tensile strengths of porous films, obtained by the tensile tests shown in FIG. 11(a).

The results from the tensile tests of the porous films 12 prepared under different gas pressures are shown in FIG. 14. As shown in FIG. 14, the results from the tensile tests revealed that the adhesive underwent internal breakage, and the tensile strength was 40 MPa or more when the gas pressure was 483 kPa and 620 kPa. It was also observed that the porous film 12 underwent internal breakage, and the tensile strength was about 32 MPa when the gas pressure was 312 kPa. These results suggest that a gas pressure of 483 kPa or more, that is, a porosity of the porous film 12 of 6% or more with the average porosity of 12% or more can confer a strength of at least 40 MPa or more on the porous film, and thus when a composite member is manufactured with that porous film 12, the metal member 11 and the resin-containing member 13 joined together are more resistant to separation.

REFERENCE SIGNS LIST

11: Metal member
12: Porous film
13: Resin-containing member
21: Joining tool
21a: Shoulder
21b: Probe
31: Adhesive
32: Base material

What is claimed is:
1. A composite member, comprising:
a metal member,
a porous film formed directly on a surface of the metal member, and
a resin-containing member provided on the porous film in a side opposite to the metal member,
wherein the porous film has a porosity of 4% or more and a film thickness of 25 μm or more and 280 μm or less, and
wherein the metal member and the resin-containing member are joined together by allowing a portion of the resin-containing member to enter into voids of the porous film.

2. The composite member according to claim 1, wherein the metal member is made of a different metal than the porous film.

3. The composite member according to claim 1, wherein the resin-containing member is a thermoplastic resin material.

4. The composite member according to claim 1, wherein the resin-containing member comprises a thermosetting member having a fibrous reinforcing material and a resin.

5. The composite member according to claim 1, wherein the porous film is formed by impacting the metal member with a metal powder, wherein the metal powder is selected from the group consisting of aluminum, an aluminum alloy, stainless steel, titanium, and a titanium alloy, and wherein the composite member has a tensile shear strength of at least 12 MPa.

6. The composite member according to claim 5, wherein the metal powder is selected from the group consisting of titanium and a titanium alloy.

7. The composite member according to claim 5, wherein the porous film has a porosity of from 6% or more to 30% or less.

8. The composite member according to claim 1, wherein the porous film is made of titanium.

9. A method for manufacturing a composite member, comprising joining a metal member with a resin-containing member by heating the metal member while pressing the resin-containing member against a porous film formed directly on a surface of the metal member, wherein the porous film has a porosity of 4% or more and a film thickness of 25 μm or more and 280 μm or less wherein the metal member and the resin-containing member are joined together by allowing a portion of the resin-containing member to enter into voids of the porous film.

10. The method for manufacturing a composite member according to claim 9, wherein the porous film is formed by impacting the surface of the metal member with metal powder by a cold spray process.

11. The method for manufacturing a composite member according to claim 9, wherein the porous film is comprised of a metal, and the metal member is made of a different metal than the porous film.

12. The method for manufacturing a composite member according to claim 9, wherein the metal member is heated by friction while pressing the metal member against the resin-containing member in a state where the resin-containing member is in contact with the porous film.

13. The method for manufacturing a composite member according to claim 9, wherein the resin-containing member is a thermoplastic resin material.

14. The method for manufacturing a composite member according to claim 9, wherein the resin-containing member comprises a thermosetting member having a fibrous reinforcing material and a resin.

* * * * *